(12) United States Patent
Niki et al.

(10) Patent No.: US 6,345,647 B2
(45) Date of Patent: Feb. 12, 2002

(54) FLUID-IMPERMEABLE COMPOSITE HOSE

(75) Inventors: Nobuaki Niki; Masanobu Ohnishi, both of Inuyama; Makoto Yoshino; Keiichi Kitamura, both of Kariya, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/810,569

(22) Filed: Mar. 19, 2001

(30) Foreign Application Priority Data

Mar. 21, 2000 (JP) ............................. 12-083214

(51) Int. Cl.[7] .................................................. F16L 11/08
(52) U.S. Cl. ........................ 138/126; 138/137; 138/141; 138/DIG. 10
(58) Field of Search ................................. 138/126, 137, 138/141, 140, 125, DIG. 1, DIG. 10, DIG. 7

(56) References Cited

U.S. PATENT DOCUMENTS

| | | | |
|---|---|---|---|
| 3,614,967 A | * 10/1971 | Royston | 138/149 |
| 4,510,974 A | * 4/1985 | Natori et al. | 138/137 |
| 4,905,736 A | * 3/1990 | Kitami et al. | 138/137 |
| 5,271,977 A | * 12/1993 | Yoshikawa et al. | 428/35.9 |
| 5,362,530 A | * 11/1994 | Kitami et al. | 428/36.2 |
| 5,476,121 A | * 12/1995 | Yoshikawa et al. | 138/138 |
| 5,488,975 A | * 2/1996 | Chiles et al. | 138/125 |
| 5,622,210 A | * 4/1997 | Crisman et al. | 138/140 X |
| 5,839,478 A | * 11/1998 | Colcombet et al. | 138/140 X |
| 6,074,717 A | * 6/2000 | Little et al. | 138/143 X |

* cited by examiner

Primary Examiner—Patrick Brinson
(74) Attorney, Agent, or Firm—Jacobson Holman, PLLC

(57) ABSTRACT

A fluid-impermeable composite hose has a laminated layer having a high impermeability to a refrigerant, etc. and held between two resin layers having a thickness which is small enough to enable the hose to remain flexible. The resin layers secure and protect the laminated layer and protect a metallic foil in the laminated layer from any bending, deforming or stretching force acting upon the hose.

20 Claims, 2 Drawing Sheets

FLUID-IMPERMEABLE COMPOSITE HOSE

BACKGROUND OF THE INVENTION

1. Field of the Invention

This invention relates to a fluid-impermeable composite hose. More particularly, it relates to a fluid-impermeable composite hose having a fluid-impermeable layer formed by sandwiching between two thin resin layers a laminated layer containing a metallic foil, or a metallic layer formed by vapor deposition. The hose of this invention is particularly suitable for use on a motor vehicle as a hose for transporting a refrigerant, such as carbon dioxide, or as a fuel hose.

2. Description of the Related Art

It is strongly desired in view of system maintenance, environmental protection, etc. that every hose used for transporting a refrigerant, such as carbon dioxide, in an air-conditioning system on a motor vehicle be impermeable to the refrigerant. One of the most effective approaches lies in a hose having a laminated wall layer which contains a metallic foil, or a metallic layer formed by vapor deposition. Environmental protection also requires a fuel hose to be impermeable to fuel, and a laminated wall layer is very useful for a fuel hose, too.

When making a hose having such a laminated layer in its wall, it has hitherto been usual to form, for example, a rubber layer having high refrigerant or fuel resistance and impermeability inwardly of such a laminated layer. For making a hose required to withstand a high pressure, it has been usual to surround such a laminated layer by an intermediate rubber layer, etc., then by a reinforcing yarn layer and finally by an outer rubber layer.

The laminated layer employed as described is, however, not thoroughly secured or reinforced in the wall of the hose. Therefore, it is directly affected by any bending, deforming or stretching force acting upon the wall of the hose as a result of e.g. an elevation in pressure of the refrigerant in the hose, the vibration of the vehicle, or any impact bearing upon it. Thus, the metallic foil or layer in the laminated layer is easily broken and the hose loses its fluid impermeability.

SUMMARY OF THE INVENTION

It is, therefore, an object of this invention to prevent effectively any breakage of a metallic foil or layer in a laminated layer of a fluid-impermeable composite hose. The inventors of this invention have thought that it is very effective to sandwich a laminated layer between two thin resin layers, and that the hose is flexible enough if those resin layers are adequate.

According to a first aspect of this invention, there is provided a hose having a wall comprising a fluid-impermeable layer of a sandwiched structure in which a laminated layer is held between two thin resin layers, the laminated layer containing a metallic foil, or a metallic layer formed by vapor deposition. The laminated layer is secured and protected by the two thin resin layers located radially inwardly and outwardly thereof. The bending, deforming or stretching force acting upon the hose for various reasons is absorbed or diminished by those resin layers, and is not directly transmitted to the laminated layer. No force acts upon the metallic foil or layer in the laminated layer to twist, bend, stretch or otherwise deform it. Thus, the metallic foil or layer is not easily broken, and the hose does not lose its fluid impermeability.

According to a second aspect of this invention, the fluid-impermeable layer forms the innermost layer of the wall of the hose. The thin resin layer on the inside of the fluid-impermeable layer is superior to any rubber layer in refrigerant impermeability. Unlike a rubber layer, it does not deteriorate by swelling or foaming even when carbon dioxide as a refrigerant is in its supercritical state at a high temperature and a high pressure. Thus, the hose is particularly suitable as a hose for transporting carbon dioxide as a refrigerant for e.g. an air conditioner on a motor vehicle.

According to a third aspect of this invention, the wall has a rubber layer inwardly of the fluid-impermeable layer. Such a layer can be of a material having a high resistance to swelling with fuel and a high impermeability to fuel, such as fluororubber (FKM) or acrylonitrile-butadiene rubber (NBR), so that the hose may be suitable as a fuel hose.

According to a fourth aspect of this invention, the wall has a reinforcing layer and an outer rubber layer outwardly of the fluid-impermeable layer. The reinforcing layer gives pressure resistance and strength to the hose. The outer rubber layer gives ozone resistance to the hose, protects it from any external impact, and improves the tightness of a seal in a joint between the hose and a pipe.

According to a fifth aspect of this invention, the wall has an intermediate rubber layer interposed between the fluid-impermeable layer and the reinforcing layer. The intermediate rubber layer gives an improved adhesion between the fluid-impermeable layer and the reinforcing layer, diminishes any bending, deforming or stretching force acting upon the fluid-impermeable layer, and improves the flexibility of the hose as a whole.

According to a sixth aspect of this invention, the laminated layer is formed by spirally winding or longitudinally lapping a tape of a laminated sheet containing one of the following (1) to (3) and a resin film or films laminated thereon:

(1) a metallic foil;
(2) a metallic foil and a reinforcing material; and
(3) a metallic layer formed by vapor deposition.

The resin film (or films) protects the metallic foil or layer when the hose is bent, deformed or stretched. The metallic foil or layer is not easily damaged or broken by fatigue, and the hose maintains its high fluid impermeability for a long time. Spiral winding or longitudinal lapping makes it very easy to form the laminated layer on a tubular hose body. If the laminated sheet contains a metallic foil and a reinforcing material, its stretch resistance makes it possible to avoid the breakage of the foil even if the hose may be stretched or bent by a force which is too strong to be resisted by the resin film (or films) alone.

According to a seventh aspect of this invention, at least one of the thin resin layers on the inside and outside of the fluid-impermeable layer is of an ethylene-vinyl alcohol copolymer resin (EVOH), a blend of a polyamide and a modified polyolefin resin, a polyamide resin, or a fluororesin. All of these resins are high in fluid impermeability for refrigerant or fuel and in flexibility, so that the hose has a still higher fluid impermeability, and is flexible enough to withstand the vibration of a motor vehicle, or its engine.

According to an eighth aspect of this invention, at least one of the thin resin layers on the inside and outside of the fluid-impermeable layer has a thickness of 20 to 300 $\mu$m. This is a preferred range in which the resin layers can perform its protective action effectively and thus ensure the fluid impermeability without affecting the flexibility of the hose in any way.

The above and other features and advantages of this invention will become more apparent from the following description and the accompanying drawings.

DETAILED DESCRIPTION OF THE INVENTION

Uses of Hoses

Figure 1:
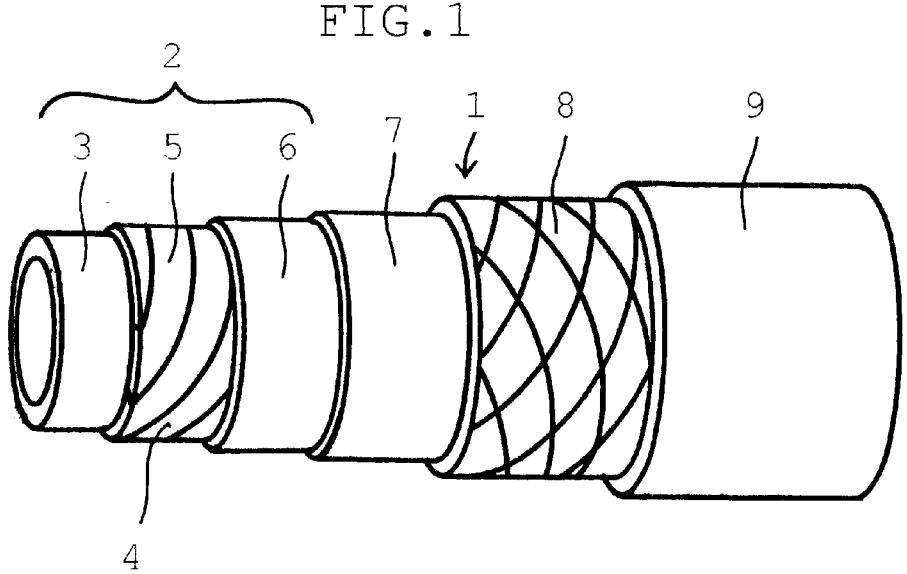
FIG. 1 is a partly cutaway perspective view of a hose embodying this invention.

The fluid-impermeable composite hose of this invention can be used for transporting various kinds of fluids. Its preferred use is, however, for transporting a refrigerant, or fuel, particularly in a motor vehicle.

In the case where the refrigerant is carbon dioxide, the fluid-impermeable composite hose according to the second aspect is preferred, and the fluid-impermeable composite hose according to the third aspect is preferred as the fuel hose.

Wall Construction of Hoses

The hose of this invention comprises in its wall a fluid-impermeable layer formed by sandwiching a laminated layer containing a metallic foil or a metallic layer formed by vapor deposition, between two thin resin layers. It may or may not have another layer or layers. The laminated layer may be employed in any position relative to the remaining layer or layers and may, for example, be employed as an inner or intermediate layer.

The fluid-impermeable layer may form the innermost layer of the wall, or may be lined with a rubber layer. The latter may be of any rubber, but is preferably of e.g. FKM or NBR if the hose is a fuel hose.

The fluid-impermeable layer may be surrounded by another layer, or layers. For example, it may be surrounded by a reinforcing layer and an outer rubber layer, and an intermediate rubber layer may be interposed between the fluid-impermeable layer and the reinforcing layer.

Fluid-Impermeable Layer

The laminated layer and the inner and outer thin resin layers which form the fluid-impermeable layer are preferably bonded to one another. However, they may not be bonded. A usually appropriate process for making the fluid-impermeable layer may include forming the inner resin layer by extrusion, forming the laminated layer about it and forming the outer resin layer by extrusion, though other appropriate processes may be used.

Laminated Layer

The laminated layer may be of any construction if it is a laminate containing a metallic foil or a metallic layer formed by vapor deposition. However, it is preferably composed of (1) a metallic foil, (2) a metallic foil with a reinforcing material, or (3) a metallic layer formed by vapor deposition; and a resin film or films laminated thereon.

The laminated layer is preferably formed by spirally winding or longitudinally lapping a tape of a laminated sheet composed of one of the (1) to (3) above, and a resin film or films. Spiral winding is a method in which a tape of a laminated sheet is wound spirally to form a cylindrical layer having no gap between any two adjoining turns. Longitudinal lapping is a method in which a tape of a laminated sheet having a width large enough to encircle a hose to be made is placed in parallel to the longitudinal axis of the hose and bent into a cylindrical layer having no gap between two longitudinal edges thereof.

The laminated sheet is usually made by placing the metallic foil or the metallic layer between two resin films and bonding the films to each other with an adhesive, or welding them to each other. A laminated sheet containing a metallic layer formed by vapor deposition may be made by forming such a layer on one side of a resin film and welding or otherwise bonding another resin film to that side. A laminated sheet may also be made by forming a metallic layer by vapor deposition on each of two resin films and welding or otherwise bonding the films to each other in such a way that the metallic layers may join each other.

In a combination of a metallic foil and a reinforcing material, the reinforcing material is preferably bonded to the foil to produce a higher reinforcing effect. The reinforcing material is preferably situated radially outwardly of the foil. The foil and reinforcing material may or may not be bonded to the resin films. While any kind of reinforcing material may be used, preferred examples are a wire mesh and a reinforcing cloth because of their high stretch resistance and flexibility. Examples of the reinforcing cloths include a canvas and a nonwoven fabric, preferably made from aramid, carbon, glass or like fibers of low stretchability. A resin film of high strength can also be used as the reinforcing material.

The resin films may be of any appropriate resin, such as a polyamide resin, a polyethylene-terephthalate resin or EVOH. Each film preferably has a thickness of, say, 5 to 100 $\mu$m. If its thickness is too large, the laminated sheet is difficult to apply by spiral winding or longitudinal lapping.

The laminated sheet spirally wound or longitudinally lapped preferably has a pair of spirally or longitudinally extending edge portions overlapping each other to ensure high fluid impermeability. Its overlapping edge portions are preferably bonded to each other to ensure a still higher degree of fluid impermeability.

Thin Resin Layers

Any resinous material may be used for the thin resin layers between which the laminated layer is held to form the fluid-impermeable layer, since the resinous materials are generally more impermeable to a refrigerant or fuel than rubbers are. Moreover, the resinous materials are much less liable to deteriorate by swelling or foaming with carbon dioxide in its supercritical state.

Preferred resinous materials, however, include EVOH and a polyamide resin. Other preferred examples include a modified polyolefin resin obtained by graft polymerization of an unsaturated carboxylic acid or a derivative thereof to a polyolefin consisting basically of e.g. ethylene or propylene, and a mixture of any such modified polyolefin resin and a polyamide resin. These resins are all superior in impermeability and resistance to a refrigerant or fuel, and in flexibility as well. EVOH is, among others, preferred, since it enables the fluid-impermeable layer to resist any undesirably large drop in fluid impermeability even if the metallic foil or layer may have been damaged or broken.

Examples of the preferred polyamide resins include nylon 6, nylon 66, nylon 11, nylon 12, or a copolymer thereof, and a polyamide resin having an aromatic, such as m-xylenediamine, in its principal chain. Other preferred resinous materials include polyethylene or polybutylene terephthalate, and polyethylene or polybutylene naphthalate.

The resin layers can be formed by any known method, such as extrusion molding. They preferably have a thickness not exceeding 300 $\mu$m each, or not exceeding 500 $\mu$m in total, to ensure the flexibility of the hose. An extremely small layer thickness in the order of, say, less than 20 μm should, however, be avoided to ensure fluid impermeability and the formation of a resin layer of uniform thickness not having any opening therein.

The resin layers are preferably bonded to the laminated layer by, for example, using an adhesive, or welding.

Intermediate Rubber Layer

An intermediate rubber layer may be interposed between the fluid-impermeable layer and a reinforcing layer surrounding it, if any, to ensure improved adhesion, protection and flexibility, as stated before. The intermediate rubber layer gives effects as mentioned above with respect to the fifth aspect of the invention. It is preferably of, for example, butyl rubber (IIR), halogenated butyl rubber, ethylene-propylene rubber, ethylene-propylene-diene rubber (EPDM), or nitrile rubber (NBR). These rubbers are high in fluid impermeability and flexibility, and easily achieve a good adhesion to the fluid-impermeable and reinforcing layers at a high temperature. The intermediate rubber layer preferably has a thickness of, say, 0.2 to 1.5 mm.

Reinforcing Layer

The hose preferably has a reinforcing layer in its wall. The reinforcing layer may, for example, be a braided wire layer, or a layer formed by braiding reinforcing yarn, or winding reinforcing yarn in two spiral layers extending in the opposite directions, or placing an intermediate rubber layer between two such spiral layers.

Outer Rubber Layer

An outer rubber layer may form the outermost wall layer of the hose. It is preferably of any rubber of high weatherability, such as chloroprene rubber (CR), IIR, chlorosulfonated polyethylene rubber (CSM), or EPDM.

DESCRIPTION OF THE PREFERRED EMBODIMENTS

Referring first to FIG. 1, a fluid-impermeable composite hose 1 sequentially comprises a fluid-impermeable layer 2 as the innermost layer of its wall, an intermediate rubber layer 7 formed from IIR, a reinforcing layer 8 formed by braiding an appropriate kind of reinforcing yarn, and an outer rubber layer 9 formed from IIR.

The fluid-impermeable layer 2 is composed of an inner thin resin layer 3 formed by extrusion from EVOH and having a thickness of 150 μm, a laminated layer 5 formed by winding a tape of a laminated sheet 4 spirally, and an outer thin resin layer 6 formed by extrusion from EVOH and having a thickness of 150 μm.

The outer thin resin layer 6 and the intermediate rubber layer 7 are appropriately bonded to each other by vulcanization, and so are the intermediate rubber layer 7 and the reinforcing layer 8. The laminated sheet 4 has a pair of spirally extending edge portions overlapping each other and bonded to each other.

Figure 2:
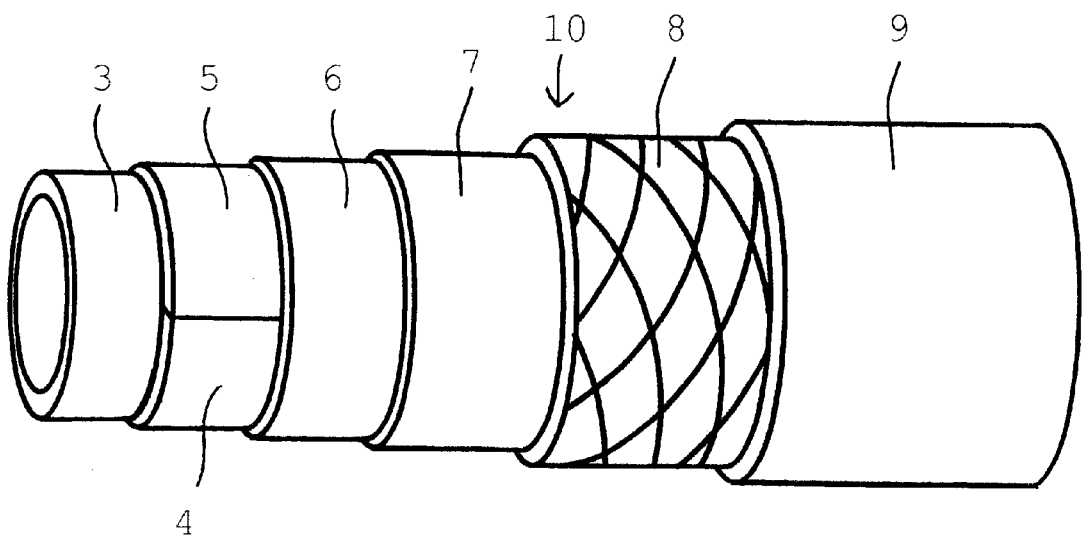
FIG. 2 is a view similar to FIG. 1, but showing a different embodiment.

FIG. 2 shows a hose 10 according to another embodiment of this invention. Its fluid-impermeable layer is composed of an inner thin resin layer 3 formed from a polyamide resin, a laminated layer 5 formed by longitudinally lapping a tape of a laminated sheet 4 and having a pair of longitudinally extending edge portions overlapping each other and bonded to each other, and an outer thin resin layer 6 formed from a polyamide resin. In other respects, the hose 10 is identical to the hose 1 shown in FIG. 1.

Figure 3A:
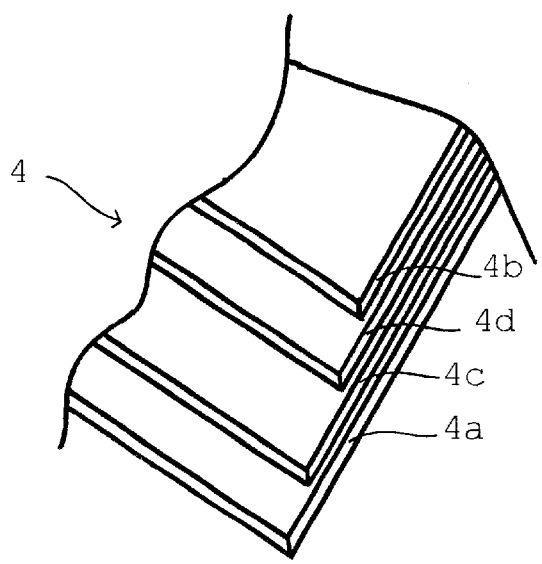
FIG. 3A is fragmentary perspective view of a laminated sheet embodying this invention.
Figure 3B:
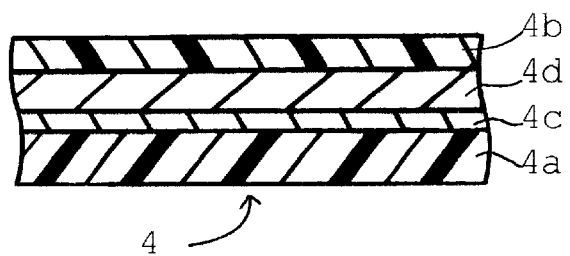
FIG. 3B is a cross sectional view thereof.

The laminated sheet 4 used in the hoses shown in FIGS. 1 and 2 are shown in detail in FIGS. 3A and 3B. It includes an aluminum foil 4c as a metallic foil and a resin sheet as a reinforcing material 4d which are sandwiched between an inner resin layer 4a in the form of a thin film of a thermoplastic PET resin and a similar outer resin layer 4b, and bonded thereto.

The metallic foil 4c is bonded to the reinforcing material 4d with an adhesive not shown, and is thereby so bound as not to be affected at all by any tensile or like force acting upon the laminated sheet 4.

Figure 3C:
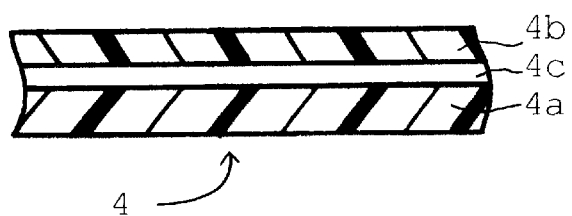
FIG. 3C is a view similar to FIG. 3B, but showing a modified form of a laminated sheet.

FIG. 3C shows a modified form of laminated sheet 4. It does not have any reinforcing material as shown at 4d in FIG. 3B., but has only a metallic foil 4c held between its inner and outer resin layers 4a and 4b.

While the invention has been described by way of its preferred embodiments, it is to be understood that variations or modifications may be easily made by those skilled in the art without departing from the scope of this invention which is defined by the appended claims.

What is claimed is:

1. A fluid-impermeable composite hose having a wall comprising a fluid-impermeable layer of a sandwiched structure in which a laminated layer is held between two thin resin layers, the laminated layer containing a metallic foil, or a metallic layer formed by vapor deposition.

2. The hose according to claim 1, wherein the fluid-impermeable layer forms the innermost layer of the wall.

3. The hose according to claim 2 adapted to be used for transporting a refrigerant in a motor vehicle.

4. The hose according to claim 1, wherein the wall further comprises an inner rubber layer radially inwardly of the fluid-impermeable layer.

5. The hose according to claim 4 adapted to be used for transporting fuel in a motor vehicle.

6. The hose according to claim 4, wherein the rubber layer is formed of fluororubber or acrylonitrile-butadiene rubber.

7. The hose according to claim 1, wherein the wall further comprises a reinforcing layer and an outer rubber layer radially outwardly of the fluid-impermeable layer.

8. The hose according to claim 7, wherein the wall further comprises an intermediate rubber layer interposed between the fluid-impermeable layer and the reinforcing layer.

9. The hose according to claim 1, wherein the laminated layer is formed of a laminated sheet composed of one of the following (1) to (3), and a resin film or films laminated thereon:

(1) a metallic foil;
(2) a metallic foil with a reinforcing material; and
(3) a metallic layer formed by vapor deposition.

10. The hose according to claim 9, wherein the laminated layer is formed by winding a tape of the laminated sheet spirally, or lapping with it longitudinally.

11. The hose according to claim 10, wherein the foil, the foil with a reinforcing material, or the metallic layer is held between two resin films.

12. The hose according to claim 9, wherein the foil and the reinforcing material are bonded to each other.

13. The hose according to claim 12, wherein the reinforcing material is a wire mesh or a reinforcing cloth.

14. The hose according to claim 9, wherein the laminated sheet includes two resin films, and the metallic layer is formed by vapor deposition on one side of one of the resin films, the other resin film being held against that side.

15. The hose according to claim 9, wherein the laminated sheet includes two resin films, and the metallic layer is formed by vapor deposition on one side of each of the resin films, the resin films being welded or bonded to each other in such a way that the metallic layers may join each other.

16. The hose according to claim 1, wherein at least one of the resin layers is of a material selected from the group consisting of an ethylene-vinyl alcohol copolymer resin, a mixture of a polyamide resin and a modified polyolefin resin, a polyamide resin and a fluororesin.

17. The hose according to claim 1, wherein at least one of the resin layers is of an ethylene-vinyl alcohol copolymer resin.

18. The hose according to claim 16, wherein the polyamide resin is a resin selected from the group consisting of nylon 6, nylon 66, nylon 11, nylon 12, a copolymer thereof and a polyamide resin having an aromatic in its principal chain.

19. The hose according to claim 1, wherein each of the resin layers has a thickness of 20 to 300 $\mu$m.

20. The hose according to claim 1, wherein the laminated layer is bonded to the resin layers.

* * * * *